(12) United States Patent
Lamkin et al.

(10) Patent No.: US 10,600,303 B2
(45) Date of Patent: Mar. 24, 2020

(54) PET OWNER EVALUATION SYSTEM

(71) Applicant: Intel Corporation, Santa Clara, CA (US)

(72) Inventors: Andrew F. Lamkin, Beaverton, OR (US); Katherine P. Anthony, Corvalis, OR (US); Bradford H. Needham, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 85 days.

(21) Appl. No.: 15/189,265

(22) Filed: Jun. 22, 2016

(65) Prior Publication Data

US 2017/0372583 A1 Dec. 28, 2017

(51) Int. Cl.
*G08B 21/04* (2006.01)
*A01K 29/00* (2006.01)

(52) U.S. Cl.
CPC ........ *G08B 21/0423* (2013.01); *A01K 29/005* (2013.01)

(58) Field of Classification Search
None
See application file for complete search history.

(56) References Cited

U.S. PATENT DOCUMENTS

| | | | | |
|---|---|---|---|---|
| 8,704,668 B1 * | 4/2014 | Darrell | ................. | A01K 29/005 340/500 |
| 9,275,534 B2 * | 3/2016 | Alasaarela | ............ | A61B 5/0022 |
| 2009/0090305 A1 * | 4/2009 | Cheok | .................... | A01K 15/02 119/707 |
| 2009/0106044 A1 * | 4/2009 | Schweisguth | .......... | A01K 15/02 705/2 |
| 2009/0202657 A1 * | 8/2009 | Friesen | ................ | A61K 31/195 424/639 |
| 2010/0231391 A1 * | 9/2010 | Dror | ........................ | G01D 1/00 340/573.3 |
| 2013/0167207 A1 * | 6/2013 | Davis | ..................... | G06F 21/316 726/5 |
| 2013/0267795 A1 * | 10/2013 | Cosentino | ............ | A61B 5/0002 600/301 |
| 2014/0073486 A1 * | 3/2014 | Ahmed | .............. | A61B 5/02405 482/9 |
| 2014/0267299 A1 * | 9/2014 | Couse | ................... | G06T 11/206 345/440.2 |

(Continued)

OTHER PUBLICATIONS

Beetz, A, "Psychosocial and Psychophysiological Effects of Human-Animal Interactions: The Possible Role of Oxytocin", Frontiers in psychology, 3, (2012).

(Continued)

*Primary Examiner* — Chico A Foxx
(74) *Attorney, Agent, or Firm* — Schwegman Lundberg & Woessner, P.A.

(57) ABSTRACT

Embodiments of a system and method for method for automatically determining pet owner interaction with a pet are generally described herein. A method may include obtaining sensor data including pet behavior metrics from a sensor, aggregating the sensor data, and interpreting the aggregated sensor data to determine an engagement factor of a pet owner to a pet. The method may include outputting a report based on the engagement factor or the aggregated sensor data.

25 Claims, 5 Drawing Sheets

(56) References Cited

U.S. PATENT DOCUMENTS

| | | | | |
|---|---|---|---|---|
| 2015/0070172 A1* | 3/2015 | Alasaarela | ........... | A61B 5/0022 |
| | | | | 340/573.1 |
| 2015/0109439 A1* | 4/2015 | Shani | ..................... | A01K 15/02 |
| | | | | 348/143 |
| 2015/0156567 A1* | 6/2015 | Oliver | ..................... | H04W 4/80 |
| | | | | 340/870.07 |
| 2015/0182322 A1* | 7/2015 | Couse | ...................... | G01K 1/20 |
| | | | | 600/549 |
| 2016/0302393 A1* | 10/2016 | Pradeep | ............... | A01K 29/005 |
| 2016/0367188 A1* | 12/2016 | Malik | .................... | A61B 5/682 |
| 2017/0000090 A1* | 1/2017 | Hall | ..................... | A01K 29/005 |
| 2017/0319080 A1* | 11/2017 | Albert | ................. | A61B 5/0205 |

OTHER PUBLICATIONS

Garrity, Thomas F, "Pet Ownership and Attachment as Supportive Factors in the Health of the Elderly", Anthrozoos vol. 3 No. 1, (1989), 15 pgs.

Heady, Bruce, "The Relationship Between Pet Ownership and Health Outcomes: German Longitudinal Evidence", ResearchGate, (Jan. 2004), 20 pgs.

Levine, Glenn N, "Pet Owndership and Cardiovascular Risk a Scientific Statement From the American Heart Association", Circulation American Heart Association, (2013), 12 pgs.

* cited by examiner

PET OWNER EVALUATION SYSTEM

BACKGROUND

It has been shown that high amounts of human social interaction protects elders against dementia and other chronic diseases. However, it is difficult to objectively measure human social interactions. Some social interactions may occur online, such as over social media, or in different in-person locations. A person that has little face-to-face contact may still have a rich social life online. Another person may have social interaction at a senior center or at a restaurant that is difficult to measure. Even where possible, technical methods for measuring face-to-face social interaction are often complex and cumbersome.

Elders in particular may be sensitive to the stigma of wearing health related devices, or having such devices installed in their homes. Family and staff may find it difficult to discuss detected changes in activity with an elder who is fearful of losing independence.

According to some experts, pet ownership has been shown to provide a number of health benefits to a pet owner. It is estimated by some experts that over half of U.S. households have pets.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Systems and methods for automatically tracking pet owner interaction with one or more pets are described herein. The systems and methods described herein may include outputting a report indicating engagement between a pet owner and a pet. In the context of this disclosure, an owner may include any person or set of people who regularly interact with an animal (e.g., the pet), such as members of a family (e.g., parents, kids, other family members), caretakers of the animal (e.g., a vet, a dog walker, etc.), pet play care people, animal shelter people, pet breeders, pet boarding employees, friends taking care of a pets, employees (such as police or guards) who interact with an employee animal in the course of their work (e.g., a police K9), trainers, owner proxies such as show-dog handlers or horse show riders, or the like. The pet may include any animal that may interact with a human.

Pet ownership has been shown to provide a number of health benefits to the owner and pet ownership is on the rise. With the increase in pet ownership in the U.S., pet owners are looking to measure their pet's wellness. For example, there are a number of dog pedometers on the market, designed to measure the amount of exercise the dog gets. The systems and methods disclosed herein aggregate data from devices, such as dog pedometers, to measure the level of a pet's social interaction with its owner(s). The systems and methods disclosed herein measure the amount of pet/owner social interaction, to gain insight into the wellness of the pet and/or the owner, and to enable caregiver-elder conversations to indirectly address the health of the elder by discussing the health of the pet.

The systems and methods disclosed herein include a new measure of behavior to be inferred and presented: a quantity (and optionally a quality) of social interaction between a pet and an owner. In an example, sensors are used on the pet, the pet's environment, or objects that are used in pet/owner interaction, to calculate an aggregated value of total pet/owner social interaction. That value may be used to provide the owner, the owner's family, or the owner's formal caregivers insight into the social interactions of the owner and the pet. For example, a dog collar may include a sensor that determines when the collar is attached to a leash. In combination with a dog pedometer, a system may measure the time the dog is walking while attached to the leash.

The time measured while the dog is walking and attached to the leash may be used to determine a dog-owner social interaction time value, and is distinguishable from just dog exercise time, such as when the dog is running around the house, possibly without owner interaction. The social interaction time value may be used to present values or trends in the interaction time to the owner, the owner's family, or caregivers of the owner. The values or trends may be presented to the family or caregiver to converse with the owner about what caused the values or trends, or how the owner might increase that dog interaction time. For example, the owner may be an elderly person. A large decrease in social time between dog and owner may suggest an issue with the owner, such as depression, mobility issues, dementia or other chronic diseases.

Monitoring an elder using social interaction with a pet is less stigmatizing than traditional methods. A system that monitors sensors on the pet or the objects the pet interacts with rather than the elder directly is not overtly about the health or behavior of the elder. The system enables the elder and their family/caregivers to frame the system as "I'm fine, but I'm doing this to keep an eye on my dog's health." For example, the elder may welcome discussions of how to get out of the house more with the elder's pet, while the elder may resist discussions of how the elder might increase his or her own exercise.

Monitoring a pet owner using social interaction with a pet is less cumbersome than traditional methods. In an example, the pet owner may not wear any sensors. Further, because pet and pet owner social interaction may be mediated through specific objects (e.g., leash, tug toy, etc.), sensors may be placed on those objects.

In another example, pet health may be a primary focus of monitoring pet and pet owner interaction. For example, an owner, pet rescue group, or a professional pet breeder may be concerned with pet treatment by the owner or a pet sitter/walker. Measuring social interactions of the pet may provide an objective measure of the pet's quality of life. For example, a pet day-care space may evaluate the social wellness of a dog before accepting it into the day care. In another example, obedience training may be promoted as a way to develop a stronger social bond between a pet and pet owner. Pet training instructors may use measures of changes in a pet's social interaction to illustrate the benefits of the training. For example, trends in social interaction may be monitored to update a pet owner on the benefits of training when the owner spends more time with the pet after training.

The systems and methods described herein may monitor a pet that is capable of interaction with humans. For example, people often own and interact with dogs. A number of other types of pets may also be monitored for interaction with humans, for example, cats, rabbits, birds, large "pasture pets" such as goats and horses, etc. The interaction of the pet with a human may include a specific person who interacts with the pet or a set of people, for example a family or pet-play-care staff. To monitor the interactions between a pet and a person or people, a sensor or set of sensors may be used. The sensor or sensors may be designed to detect significant behaviors, described in more detail below.

The sensor or sensors may be used to send sensor data that may be aggregated by a processor to generate a measure of pet and human social interaction. For example, a quantity or a quality of human to pet interaction may be determined from the sensor data. In an example, the amount of time a sensor shows interaction between a pet and human may be summed. In another example, the sensor input may be weighted, for example based on the type of sensor. In yet another example, interactions between a pet and human may be separated into low and high quality interactions. For example, filling a dog water or food bowl may be considered a low quality interaction and playing with a dog may be considered a high quality interaction. Different types of interactions may be predetermined to have a specific weight or quality, which may be predetermined by machine learning, user input, or designer input. In an example, a processor may perform analysis on the sensor data and output trends or statistics. For example, the processor may calculate typical times of interaction during the day or during the week. Changes to the trends may be monitored and reported. In an example, a user interface (UI) may be used to show aspects of the social interaction determined between a pet and an owner. For example, typical times of interaction during the day or during the week may be displayed. In an example, aspects of the social interaction between a pet and an owner may be made available to applications via an Application Programming Interface (API), for example a RESTful web interface. The API may enabling those applications to use the data for a variety of purposes, such as qualifying potential pet owners or caretakers, sending messages triggered by significant changes in social interaction, aggregation with other owner, or pet health data for use by a human or pet healthcare team, etc. In an example, a user interface may query data from a web API rather than directly querying a database.

The systems and methods described herein may detect when a pet is engaging with a human, not simply when the pet is in motion. For example, the amount and quality of a social interaction between the pet and the human may be monitored and reported.

Figure 1:
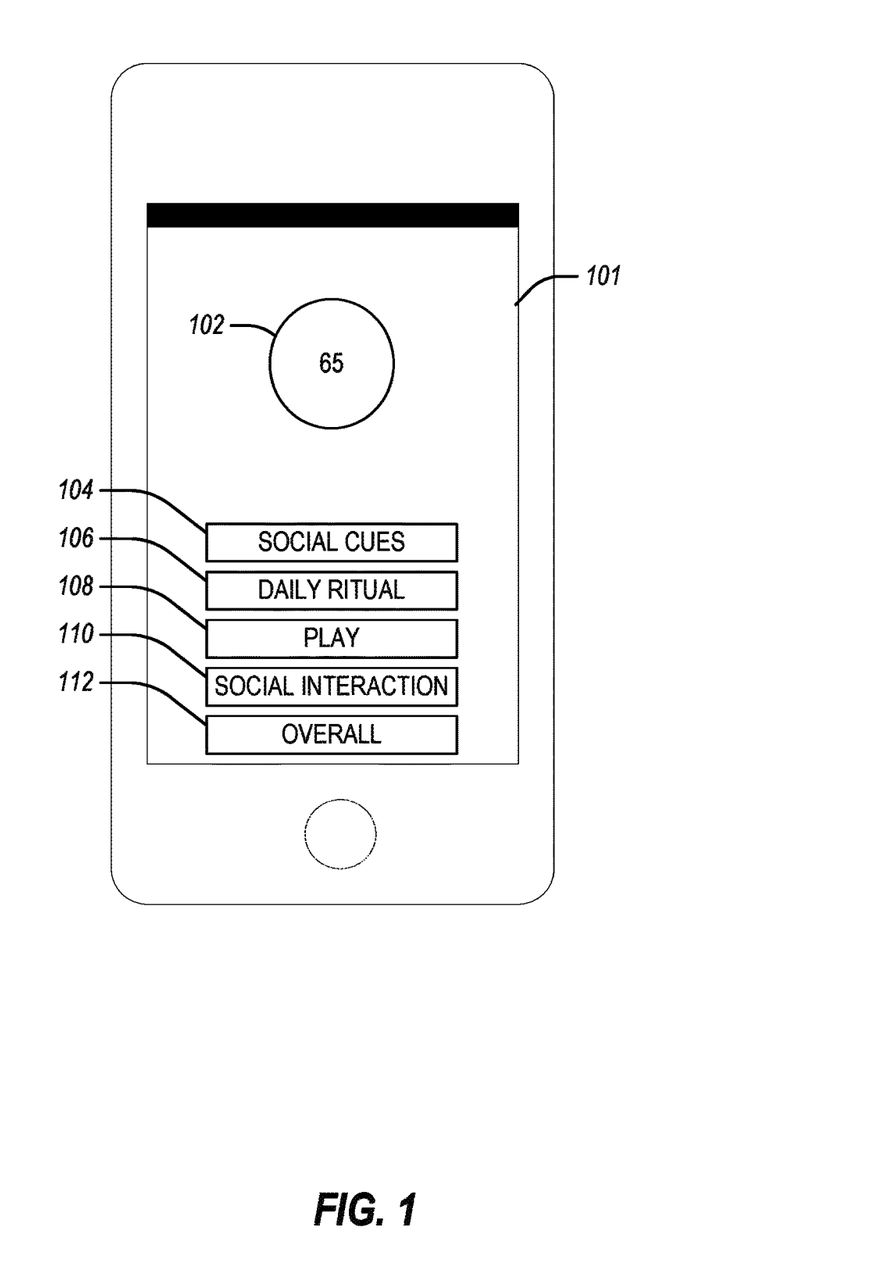
FIG. 1 illustrates a display device for displaying pet and pet owner information in accordance with some embodiments.

FIG. 1 illustrates a display device 100 for displaying pet and pet owner information in accordance with some embodiments. The display device 100 includes a display screen to display a user interface 101. The user interface 101 may display a report, visualization, suggestion, or alert. For example, the user interface 101 includes a visual representation 102 of an engagement factor of a pet owner to a pet. In an example, the user interface 101 may include options to select one or more engagement factors to display using the visual representation 102. For example, engagement factors may include social cues 104, daily ritual 106, play 108, social interaction 110, overall 112, or other options not shown. The engagement factors may be determined using sensor data. In an example, the overall 112 engagement factor may be a combination of one or more of the other engagement factors. In another example, the overall 112 engagement factor may include a weighted combination of one or more of the other engagement factors.

The engagement factors 104-110 may represent interactions between a pet owner and a pet. When a user selects one of the engagement factors 104-110, the visual representation 102 may change according to the engagement factor that was selected. For example, if the social cues 104 engagement factor is selected, the visual representation 102 may show a social cue value. In an example, when the overall 112 engagement factor is selected, the visual representation 102 may show an aggregated engagement factor, such as a combination (average or weighted) of the other engagement factors 104-110.

The social cues 104 engagement factor may include a score for a pet owner based on the pet owner recognizing and interpreting social cues from the pet. The social cues 104 engagement factor may focus on recognizing events wherein the pet owner interpreted what the pet wanted or needed and the pet owner proceeded to act accordingly, or fail to act accordingly. For example, a sensor may be used to determine that a door opened, such as by a magnetic reed switch, motion switch, or other door movement sensor in or by the door. Such a sensor may be part of a home security system. A second sensor may be used to determine that the pet went through the door (e.g., was let out), such as by a radio frequency identification (RFID) sensor in a door frame and a pet collar containing an RFID tag to be sensed by the door, or by using a pet collar global positioning system (GPS) location sensor or other location sensor. The combination of the door-opening and pet-exit sensors may be correlated and aggregated, such as by using timestamp data. This sensor combination may be more accurate than using only a pet-exit sensor, because in the latter case the owner may leave the door ajar for the pet to come and go without any interaction between the pet and the owner. Similarly, an owner who is out running and has a pet that runs around the house whenever the owner is out running may not include social interaction between the owner and the pet. By evaluating proximity between the owner and the pet, interaction rather than simply the animal behavior may be measured. The social cues 104 engagement factor may reflect an inference that the owner observed cues from the pet, interpreted them to mean that the pet needed to go out, and then acted on those social cues by letting the pet outside. Additionally, an inference that the pet was let out, but was not promptly let back in, may suggest that the owner was distracted or impaired and that the pet may be put in danger from, for example, prolonged exposure to hot or cold weather.

In an example, the social cues 104 engagement factor may include determining that a pet is inactive or has been inactive for a period of time, such as by using an on-pet sensor (i.e., a sensor worn by the pet or embedded in the pet) including, for example, an inertial sensor. In another example, determining that a pet is inactive may include determining a rapid transition of pet biosignals using a biosignal sensor (e.g., a heart rate sensor on a smart collar) to indicate relaxation. The relaxation or inactivity of the pet may be used, in conjunction with sensing of the pet owner's motion and location, to infer that a pet owner recognized that the pet wanted attention and paid attention to the pet, calming the pet.

In an example, interactions between a pet and an owner may be categorized. The categories may be used to weigh inputs, determine scores for different social interactions, or to classify sensor data. Sensor data may be used to quantify interactions that are categorized according to qualitative measures. Some example categories appear below, including example scenarios.

A Daily Ritual Category—This category focuses on recognizing events which are part of the patterns of daily living with the pet. In an example, sensing inputs may include pet motion (a source may include a pet worn inertial sensor), activity in food bowl (a source may include readings from smart food bowl), weight of food bowl increases then decreases (a source may include weight sensors under bowl). The quantitative sensor data may be used to determine the quality of the interaction between the owner and the pet, and in this case, for example, to determine that the owner has fed the pet. In another example, sensing inputs may include pet location or proximity (a source may include a pressure sensor built into a smart pet bed), pet activity (a source may include a pet worn inertial sensor). The quality of interaction determined from these sensors may include an inference that the owner is awake and moving, as the pet is likely to wake up and follow the owner when the owner leaves the bedroom, for example. In another example, the quality of interaction may show if the pet was left outside and not let back in right away, which may be a deviation from the daily pattern and also detrimental to the pet's health if the pet is sensitive to weather or high or low temperatures.

A Play Category—This category focuses on inferring playful interactions between a pet and an owner. In an example, sensing inputs may include pet activity (a source may include pet worn inertial sensors or biosignals from internal pet sensors), pet toy activity (a source may include a motion sensor embedded in a manual ball thrower, flying disk, or ball, or a tug toy with embedded stretch sensors). A determination in this category may include that the pet and the owner were playing, or that the pet initiated play with the owner or vice versa. In an example, motion classification techniques may be used to further refine the determination. For example, a motion classification technique may be used to determine whether a ball is thrown vertically or horizontally, or that the ball was dropped at an owner's feet. A motion classification technique may determine whether a pet merely carried a ball (indicating low or potentially no interaction with the owner) or whether the ball was thrown and then retrieved (indicating high interaction with the owner).

A Social Interaction Category—This category focuses on structured interaction with the pet over a span of continuous time. In an example, this category is different from recognizing and interpreting pet social cues because it may be primarily evaluated against length of time spent in the interaction. In an example, sensing inputs may include pet body position (a source may include a pet worn inertial sensor, a home camera stream, or a pet biosignal), such as when the pet body position shifts rapidly. The social interaction category may be used in this example to determine that an owner is going through commands with pet, and record a duration of interaction. In another example, sensing inputs may include pet location or proximity (a source may include a pet collar global positioning system (GPS) or Bluetooth low energy (BLE) beacon), owner location (a source may include smartphone global navigation satellite system (GNSS) or assisted GPS (AGPS)), owner activity profile (a source may include smartphone motion sensors), leash proximity (a source may include RFID, capacitance, inductive sensors). From this sensor data, it may be determined that an owner is walking the pet on a leash, and record a duration of interaction. In yet another example, sensing inputs may include activity specific pet clothing, accessories, or equipment usage (a source may include smart dog goggles, dog hiking pack, instrumented dog agility equipment), owner activity profile (a source may include smartphone motion sensors). From this sensing data, it may be determined that an owner is engaging in the activity specific to the pet equipment in use with the pet.

Figure 2:
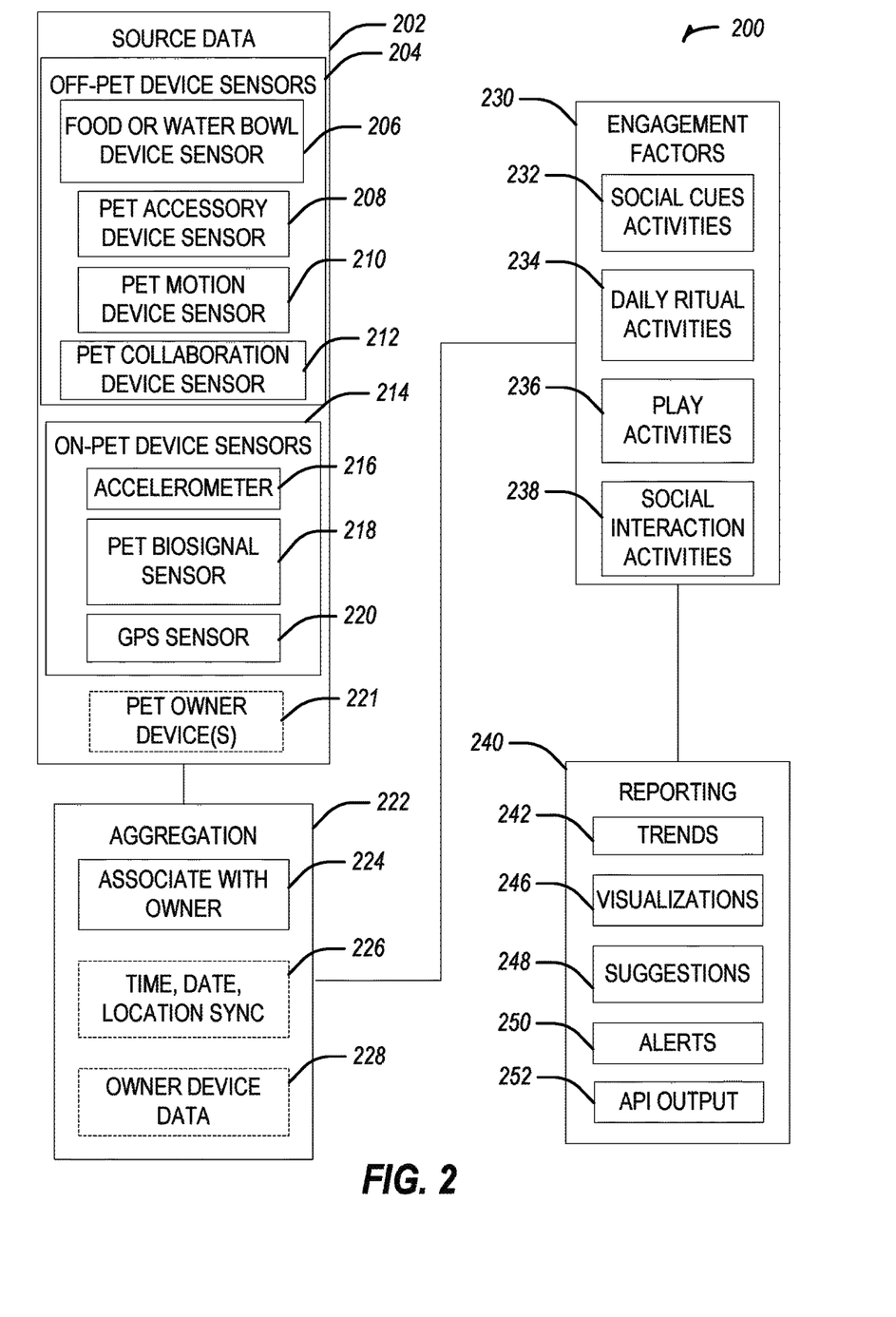
FIG. 2 illustrates a system for evaluating pet and pet owner interaction in accordance with some embodiments.

FIG. 2 illustrates a system 200 for evaluating pet and pet owner interaction in accordance with some embodiments. The system 200 includes source data component 202, an aggregation component 222, an engagement factors component 230, and a reporting component 240.

The source data component 202 includes data from off-pet device sensors 204, on-pet device sensors 214, and optionally, pet owner device(s) 221. The off-pet device sensors 204 may include a food or water bowl device sensor 206, a pet accessory device sensor 208, a pet motion device sensor 210, or a pet collaboration device sensor 212 (e.g., a pet toy, training equipment, such as buoys, bumpers, ropes, dummy birds (for retrieval), scent tins (for nose work), sledges, or other collaboration devices for working dog breeds, or the like). The on-pet device sensors 214 may include sensors on a pet wearable device. The on-pet device sensors 214 may include a movement sensor, such as an accelerometer 216 or a sensor for measurement of muscular activity directly (e.g., through Electromyography), a pet biosignal sensor 218, or a GPS sensor 220. Data received from one or more of these sensors may be used to determine an interaction score for a pet and an owner. The data may be sent to the aggregation component for aggregation.

The aggregation component 222 may include a subcomponent 224 to associate the source data with a pet owner. The aggregation component 222 may include a time, date, or location synchronization subcomponent 226 to determine, correlate, or aggregate data according to time or date stamps, location, or proximity of a device or sensor outputting the data. The aggregation component 222 may include a subcomponent 228 to aggregate owner device data, such as from the pet owner device(s) 221.

The engagement factors component 230 may include a plurality of engagement factor evaluation categories, such as social cues activities 232, daily ritual activities 234, play activities 236, or social interaction activities 238, as described above in relation to FIG. 1. These categories may use sensor data from the source data component 202 that has been aggregated by the aggregation component 222. Weighting may be added to the sensor data at the aggregation component 222 based on sensor source from the source data component 202 or at the engagement factors component 230 using the categories. Information from the engagement factors component 230 may be sent to the reporting component 240 for reporting to a user or may be sent to an interface (such as a RESTful web service or other API) using an API output subcomponent 252 for providing data to external applications.

The reporting component 240 may include subcomponents to report trends 242, visualizations 246, suggestions 248, or alerts 250. The reports may be sent to the pet owner, a caretaker of the pet owner, an interested third party (e.g., a trainer of the pet, a family member of the owner, such as child away at college or a person concerned for an elderly owner, etc.), or the like. The trends 242 may include daily, weekly, or monthly schedules or typical activities, including information on deviations from the schedules or typical activities. The trends 242 may include a visual component, such as a trend line or graph. The visualizations 246 may include an overall social interaction score, depicted visually, a set of component scores, such as for one or more of the categories from the engagement factors component 230, or a graph or picture depicting a score or set of scores (e.g., a smiley face when social interaction between the owner and the pet has been determined to exceed a threshold or a frowny face when the social interaction is below the threshold). The suggestions 248 may include recommendations for improving social interaction between an owner and a pet. In an example, the suggestions 248 may include recommendations to a caretaker or family member of the owner for checking up on the owner based on low social interaction scores with the pet. In another example, the suggestions 248 may include recommended specific activities or general statements for improving social interaction. In yet another example, the suggestions 248 may include a grade for quality of care of the pet by the owner or quality of training of the pet by the owner, for example if the owner is a child trusted with the responsibilities of raising a pet or an owner training a pet through an obedience school, respectively. The alerts 250 may include immediate or urgent alerts, such as to indicate a pet needs medical attention or that an owner may need medical attention based on a lack of care for the pet. In another example, the alerts 250 may be more routine, such as reminders to feed, give water to, exercise, or play with the pet. The alerts 250 may be sent to the owner, family member, caretaker, interested third party, or the like. In yet another example, the alert 250 may indicate that a sensor has malfunctioned, is not operating, that a battery is dead, or the like.

Figure 3:
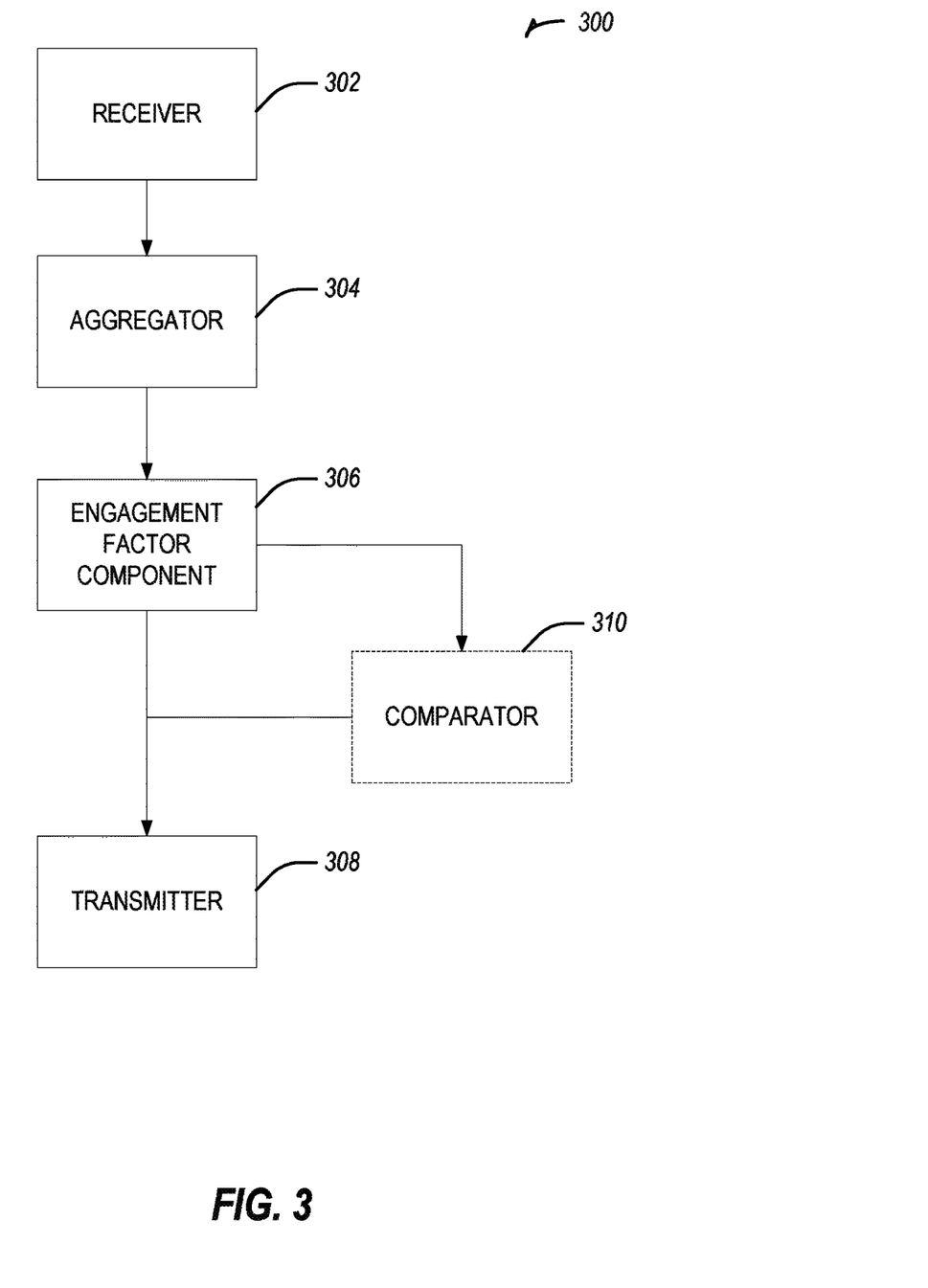
FIG. 3 illustrates a system for reporting pet and pet owner interaction in accordance with some embodiments.

FIG. 3 illustrates a system 300 for reporting pet and pet owner interaction in accordance with some embodiments. The system 300 includes a receiver 302, an aggregator 304, an engagement factor component 306, a transmitter 308, and an optional comparator 310.

The receiver 302 may be used to obtain (e.g., retrieve or receive) sensor data including pet behavior metrics from a plurality of sensors, the plurality of sensors including at least one sensor of an on-pet device and at least one sensor of an off-pet device. In an example, the on-pet device is a pet wearable device and the at least one sensor of the on-pet device includes at least one of an accelerometer, a biosensor, and a GPS sensor. In another example, the off-pet device includes at least one of a pet toy device, a pet motion sensor device, and a pet bowl device. The aggregator 304 may be used to aggregate the sensor data over a predetermined period of time.

The engagement factor component 306 may be used to interpret the aggregated sensor data to automatically determine an aggregated engagement factor of the pet owner to the pet, the aggregated engagement factor corresponding to overall interaction between the pet owner and the pet. The aggregated engagement factor may include a plurality of engagement factors, and to automatically determine the aggregated engagement factor may include automatically determining the aggregated engagement factor from the plurality of engagement factors. The engagement factor component 306 may further apply a weight to the plurality of engagement factors. In an example, the engagement factor component 306 may interpret a second set of aggregated sensor data to automatically determine a second aggregated engagement factor of the pet owner to the pet. In another example, the engagement factor component 306 may determine whether the second aggregated engagement factor exceeds the aggregated engagement factor.

The transmitter 308 drives an electrical signal on a physical communications medium (e.g., a wire, a bus, a wired network such as Ethernet, a network interface, a wireless connection, or the like). The transmitter 308 may be used to output a report indicating the aggregated engagement factor. The transmitter 308 may output the report to a user who is not the pet owner. The transmitter 308 may output data to an external interface using an API output such as a RESTful Web Service or other remote interface, in response to queries. The transmitter 308 may, in response to determining that the second aggregated engagement factor falls below the aggregated engagement factor, alert the pet owner. In another example, the report may include a trend analysis based on the aggregated engagement factor and the second aggregated engagement factor. The transmitter 308 may further provide a recommendation for improving the aggregated engagement factor.

In an example, the pet behavior metrics may indicate a leash is connected to a collar of the pet. In another example, a sensor of the plurality of sensors is a wearable device used by the pet owner, and the sensor data includes sensor data from the wearable device. To interpret the aggregated sensor data to automatically determine the aggregated engagement factor, the engagement factor component 306 may further determine that the sensor data from the wearable device includes location or proximity and timing data corresponding to the pet behavior metrics, and the report may positively reflect that the location or proximity and timing data of sensor data from the wearable device corresponds to the pet behavior metrics.

The comparator 310 may be used to determine whether the aggregated engagement factor falls below a baseline engagement factor. When the aggregated engagement factor falls below the baseline engagement factor, the transmitter 308 may output an alert indicating the aggregated engagement factor fell below the baseline engagement factor. In an example, the baseline engagement factor may be preset by the user who is not the pet owner or by the pet owner. In another example, the baseline engagement factor may be determined using a machine learning technique. The machine learning technique may be used to determine a change in activity of the pet owner over time. In another example, the transmitter 308 may, in response to determining that the aggregated engagement factor exceeds the baseline engagement factor, output an indication of a healthy overall interaction.

The components illustrated and discussed in FIG. 2 may be implemented in one or more circuits or components of system 300, as described in FIG. 3. The system 300 for reporting pet and pet owner interaction includes a receiver 302, an aggregator 304, an engagement factor component 306, a transmitter 308, and an optional comparator 310. The receiver 302, the aggregator 304, the engagement factor component 306, the transmitter 308, or the optional comparator 310 are understood to encompass tangible entities that are physically constructed, specifically configured (e.g., hardwired), or temporarily (e.g., transitorily) configured (e.g., programmed) to operate in a specified manner or to perform part or all of any operations described herein. Such tangible entitles may be constructed using one or more circuits, such as with dedicated hardware (e.g., field programmable gate arrays (FPGAs), logic gates, graphics processing unit (GPU), a digital signal processor (DSP), etc.).

As such, the tangible entities described herein may be referred to as circuits, circuitry, processor units, subsystems, or the like.

Figure 4:
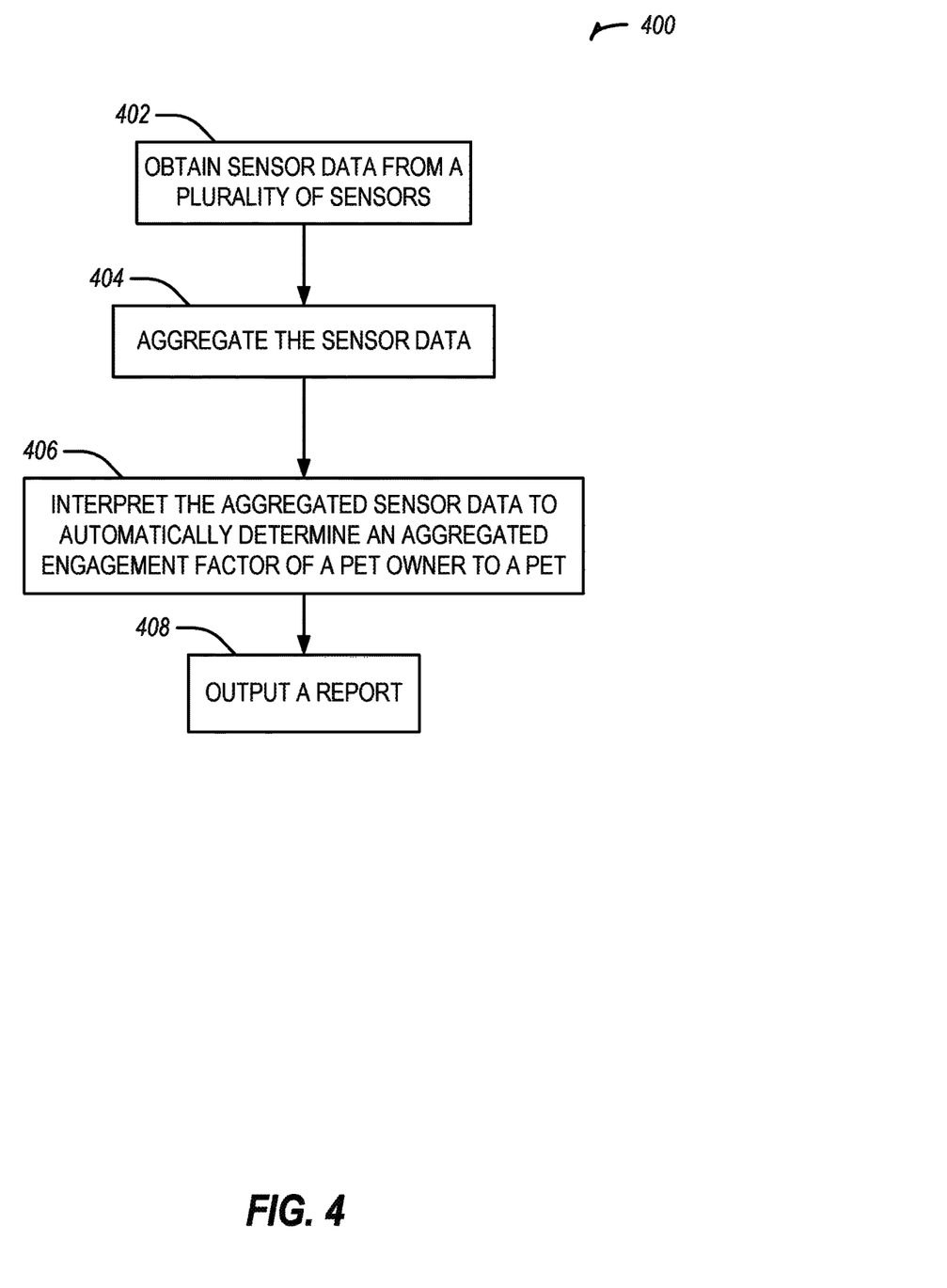
FIG. 4 illustrates a flow chart showing a technique for outputting a pet and pet owner interaction report in accordance with some embodiments.

FIG. 4 illustrates a flowchart showing a technique 400 for outputting a pet and pet owner interaction report in accordance with some embodiments. The technique 400 includes an operation 402 to obtain sensor data from a plurality of sensors. The plurality of sensors may include one or more sensors of an on-pet device (e.g., a wearable device, such as a collar, shirt, etc., including an accelerometer, a biosensor, a GPS sensor, or the like) and one or more sensors of an off-pet device (e.g., a pet toy device, a pet motion sensor device, a pet bowl device, or the like). The sensor data may include pet behavior metrics, which may indicate a leash is connected to a collar of the pet. The technique 400 includes an operation 404 to aggregate the sensor data. The sensor data may be aggregated over a predetermined period of time, such as a day.

The technique 400 includes an operation 406 to interpret the aggregated sensor data to automatically determine an aggregated engagement factor of a pet owner to a pet. The aggregated engagement factor may correspond to overall interaction between the pet owner and the pet. For example, the aggregated engagement factor may be based on a plurality of engagement factors, which may be weighted.

The technique 400 may include determining whether the aggregated engagement factor falls below a baseline engagement factor, and outputting, in response to determining that the aggregated engagement factor falls below the baseline engagement factor, an alert indicating the aggregated engagement factor fell below the baseline engagement factor. The baseline engagement factor may be preset by a user who is not the pet owner or by the pet owner. In an example, the baseline engagement factor may be determined using a machine learning technique. The machine learning technique may be used to determine a change in activity of the pet owner over time, such as a trend. In response to determining that the aggregated engagement factor exceeds the baseline engagement factor, an indication of a healthy overall interaction between the pet owner and the pet may be generated.

In another example, the technique 400 may include operations to interpret a second set of aggregated sensor data to automatically determine a second aggregated engagement factor of the pet owner to the pet, and determine whether the second aggregated engagement factor exceeds the aggregated engagement factor. In response to determining that the second aggregated engagement factor falls below the aggregated engagement factor, the technique 400 may include an operation to alert the pet owner. The report may include a trend analysis based on the aggregated engagement factor and the second aggregated engagement factor.

In an example, a sensor may be a wearable device used by the pet owner, and the sensor data may include sensor data from the wearable device. The wearable device may be coupled to a pet device (e.g., an on-pet device, such as a smart collar). Operation 406 to interpret the aggregated sensor data may include determining that the sensor data from the wearable device includes a location and timing correspondence to the pet behavior metrics. The wearable device data and the pet behavior metrics may be correlated. From the correlated data, the technique 400 may include determining that the wearable data and the pet behavior metrics indicate the pet owner and the pet were engaged in an activity together, and a positive report may be generated reflecting the corresponding data.

The technique 400 includes an operation 408 to output a report. The report may include information sent to a user who is not the pet owner, such as a caretaker of the pet owner or other interested individual, such as a person indicated by the pet owner to receive the report. The report may include data sent to an external component in response to a request from that external component, for example through a RESTful Web Service or other remote interface (e.g., API). The report may include visual metrics, an overall engagement factor value, a breakdown of values for different engagement factors, etc. The report may include a notification on a mobile device, an email, or may be displayed on a user interface of an app or application. The report may include an alert, user selectable options, trends, suggestions, or the like. The technique 400 may include providing a recommendation for improving the aggregated engagement factor.

Figure 5:
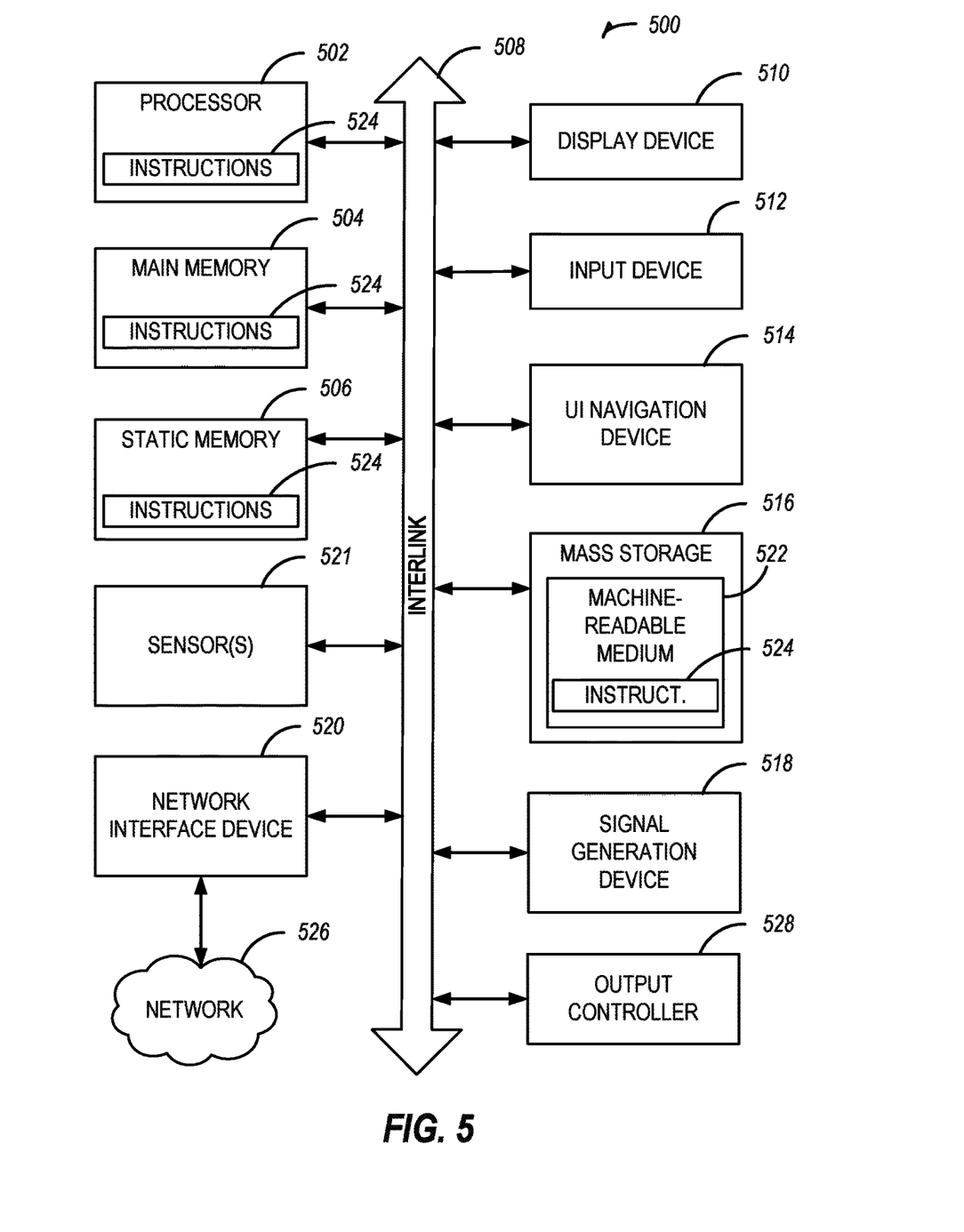
FIG. 5 illustrates generally an example of a block diagram of a machine upon which any one or more of the techniques discussed herein may perform in accordance with some embodiments.

FIG. 5 illustrates generally an example of a block diagram of a machine 500 upon which any one or more of the techniques (e.g., methodologies) discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, IEEE 802.11.1 standards known as Bluetooth®, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 is a system for automatically tracking pet owner interaction with a pet, the system comprising: a receiver to obtain sensor data including pet behavior metrics from a plurality of sensors, the plurality of sensors including at least one sensor of an on-pet device and at least one sensor of an off-pet device; an aggregator to aggregate the sensor data over a predetermined period of time; an engagement factor component to interpret the aggregated sensor data to automatically determine an aggregated engagement factor of the pet owner to the pet, the aggregated engagement factor corresponding to overall interaction between the pet owner and the pet; and a transmitter to output a report indicating the aggregated engagement factor.

In Example 2, the subject matter of Example 1 optionally includes wherein to output the report, the transmitter is to output the report to a user who is not the pet owner.

In Example 3, the subject matter of Example 2 optionally includes a comparator to determine whether the aggregated engagement factor is below a baseline engagement factor; and wherein the transmitter is further to output, in response to determining that the aggregated engagement factor is below the baseline engagement factor, an alert indicating the aggregated engagement factor is below the baseline engagement factor.

In Example 4, the subject matter of Example 3 optionally includes wherein the baseline engagement factor is preset by the user who is not the pet owner.

In Example 5, the subject matter of any one or more of Examples 3-4 optionally include wherein the baseline engagement factor is determined using a machine learning technique.

In Example 6, the subject matter of Example 5 optionally includes wherein the machine learning technique is used to determine a change in activity of the pet owner over time.

In Example 7, the subject matter of any one or more of Examples 3-6 optionally include wherein the transmitter is to, in response to determining that the aggregated engagement factor exceeds the baseline engagement factor, output an indication of a healthy overall interaction.

In Example 8, the subject matter of any one or more of Examples 1-7 optionally include wherein the on-pet device is a pet wearable device and the at least one sensor of the on-pet device includes at least one of a movement sensor, a biosensor, and a GPS sensor.

In Example 9, the subject matter of any one or more of Examples 1-8 optionally include wherein the off-pet device includes at least one of a pet collaboration device, a pet motion sensor device, and a pet bowl device.

In Example 10, the subject matter of any one or more of Examples 1-9 optionally include wherein the aggregated engagement factor includes a plurality of engagement factors, and wherein to automatically determine the aggregated engagement factor includes to automatically determine the aggregated engagement factor from the plurality of engagement factors.

In Example 11, the subject matter of any one or more of Examples 1-10 optionally include wherein the engagement factor component is further to apply a weight to the plurality of engagement factors.

In Example 12, the subject matter of any one or more of Examples 1-11 optionally include wherein the engagement factor component is further to: interpret a second set of aggregated sensor data to automatically determine a second aggregated engagement factor of the pet owner to the pet; and determine whether the second aggregated engagement factor exceeds the aggregated engagement factor.

In Example 13, the subject matter of Example 12 optionally includes wherein the transmitter is to, in response to determining that the second aggregated engagement factor is below the aggregated engagement factor, alert the pet owner.

In Example 14, the subject matter of any one or more of Examples 12-13 optionally include wherein the report includes a trend analysis based on the aggregated engagement factor and the second aggregated engagement factor.

In Example 15, the subject matter of any one or more of Examples 1-14 optionally include wherein the pet behavior metrics indicate a leash is connected to a collar of the pet.

In Example 16, the subject matter of any one or more of Examples 1-15 optionally include wherein the transmitter is further to provide a recommendation for improving the aggregated engagement factor.

In Example 17, the subject matter of any one or more of Examples 1-16 optionally include wherein a sensor of the plurality of sensors is a wearable device used by the pet owner, and the sensor data includes sensor data from the wearable device.

In Example 18, the subject matter of Example 17 optionally includes wherein to interpret the aggregated sensor data to automatically determine the aggregated engagement factor, the engagement factor component is further to determine that the sensor data from the wearable device includes location and timing data corresponding to the pet behavior metrics, and wherein the report positively reflects that the location and timing data of sensor data from the wearable device corresponds to the pet behavior metrics.

In Example 19, the subject matter of any one or more of Examples 1-18 optionally include wherein to output the report, the transmitter is to output the report using an Application Programming Interface (API) protocol.

Example 20 is a method for automatically determining pet owner interaction with a pet, the method comprising: obtaining sensor data including pet behavior metrics from a plurality of sensors, the plurality of sensors including at least one sensor of an on-pet device and at least one sensor of an off-pet device; aggregating the sensor data over a predetermined period of time; interpreting the aggregated sensor data to automatically determine an aggregated engagement factor of the pet owner to the pet, the aggregated engagement factor corresponding to overall interaction between the pet owner and the pet; and outputting a report indicating the aggregated engagement factor.

In Example 21, the subject matter of Example 20 optionally includes wherein outputting the report includes outputting the report to a user who is not the pet owner.

In Example 22, the subject matter of Example 21 optionally includes determining whether the aggregated engagement factor is below a baseline engagement factor, and outputting, in response to determining that the aggregated engagement factor is below the baseline engagement factor, an alert indicating the aggregated engagement factor is below the baseline engagement factor.

In Example 23, the subject matter of Example 22 optionally includes wherein the baseline engagement factor is preset by the user who is not the pet owner.

In Example 24, the subject matter of any one or more of Examples 22-23 optionally include wherein the baseline engagement factor is determined using a machine learning technique.

In Example 25, the subject matter of Example 24 optionally includes wherein the machine learning technique is used to determine a change in activity of the pet owner over time.

In Example 26, the subject matter of any one or more of Examples 22-25 optionally include in response to determining that the aggregated engagement factor exceeds the baseline engagement factor, outputting an indication of a healthy overall interaction.

In Example 27, the subject matter of any one or more of Examples 20-26 optionally include wherein the on-pet device is a pet wearable device and the at least one sensor of the on-pet device includes at least one of a movement sensor, a biosensor, and a GPS sensor.

In Example 28, the subject matter of any one or more of Examples 20-27 optionally include wherein the off-pet device includes at least one of a pet collaboration device, a pet motion sensor device, and a pet bowl device.

In Example 29, the subject matter of any one or more of Examples 20-28 optionally include wherein the aggregated engagement factor includes a plurality of engagement factors, and wherein to automatically determine the aggregated engagement factor includes to automatically determine the aggregated engagement factor from the plurality of engagement factors.

In Example 30, the subject matter of any one or more of Examples 20-29 optionally include applying a weight to the plurality of engagement factors.

In Example 31, the subject matter of any one or more of Examples 20-30 optionally include interpreting a second set of aggregated sensor data to automatically determine a second aggregated engagement factor of the pet owner to the pet; and determining whether the second aggregated engagement factor exceeds the aggregated engagement factor.

In Example 32, the subject matter of Example 31 optionally includes in response to determining that the second aggregated engagement factor is below the aggregated engagement factor, alerting the pet owner.

In Example 33, the subject matter of any one or more of Examples 31-32 optionally include wherein the report includes a trend analysis based on the aggregated engagement factor and the second aggregated engagement factor.

In Example 34, the subject matter of any one or more of Examples 20-33 optionally include wherein the pet behavior metrics indicate a leash is connected to a collar of the pet.

In Example 35, the subject matter of any one or more of Examples 20-34 optionally include providing a recommendation for improving the aggregated engagement factor.

In Example 36, the subject matter of any one or more of Examples 20-35 optionally include wherein a sensor the plurality of sensors is a wearable device used by the pet owner, and the sensor data includes sensor data from the wearable device.

In Example 37, the subject matter of Example 36 optionally includes wherein interpreting the aggregated sensor data to automatically determine the aggregated engagement factor includes determining that the sensor data from the wearable device includes a location and timing correspondence to the pet behavior metrics, and wherein the report positively reflects that the location and timing data of sensor data from the wearable device corresponds to the pet behavior metrics.

In Example 38, the subject matter of any one or more of Examples 20-37 optionally include wherein outputting the report includes outputting the report using an Application Programming Interface (API) protocol.

Example 39 is at least one machine-readable medium including instructions for operation of a computing system, which when executed by a machine, cause the machine to perform operations of any of the methods of Examples 20-38.

Example 40 is an apparatus comprising means for performing any of the methods of Examples 20-38.

Example 41 is an apparatus for automatically determining pet owner interaction with a pet, the apparatus comprising: means for obtaining sensor data including pet behavior metrics from a plurality of sensors, the plurality of sensors including at least one sensor of an on-pet device and at least one sensor of an off-pet device; means for aggregating the sensor data over a predetermined period of time; means for interpreting the aggregated sensor data to automatically determine an aggregated engagement factor of the pet owner to the pet, the aggregated engagement factor corresponding to overall interaction between the pet owner and the pet; and means for outputting a report indicating the aggregated engagement factor.

In Example 42, the subject matter of Example 41 optionally includes wherein the means for outputting the report include means for outputting the report to a user who is not the pet owner.

In Example 43, the subject matter of Example 42 optionally includes means for determining whether the aggregated engagement factor is below a baseline engagement factor, and means for outputting, in response to determining that the aggregated engagement factor is below the baseline engagement factor, an alert indicating the aggregated engagement factor is below the baseline engagement factor.

In Example 44, the subject matter of Example 43 optionally includes wherein the baseline engagement factor is preset by the user who is not the pet owner.

In Example 45, the subject matter of any one or more of Examples 43-44 optionally include wherein the baseline engagement factor is determined using a machine learning technique.

In Example 46, the subject matter of Example 45 optionally includes wherein the machine learning technique is used to determine a change in activity of the pet owner over time.

In Example 47, the subject matter of any one or more of Examples 43-46 optionally include in response to determining that the aggregated engagement factor exceeds the baseline engagement factor, means for outputting an indication of a healthy overall interaction.

In Example 48, the subject matter of any one or more of Examples 41-47 optionally include wherein the on-pet device is a pet wearable device and the at least one sensor of the on-pet device includes at least one of a movement sensor, a biosensor, and a GPS sensor.

In Example 49, the subject matter of any one or more of Examples 41-48 optionally include wherein the off-pet device includes at least one of a pet collaboration device, a pet motion sensor device, and a pet bowl device.

In Example 50, the subject matter of any one or more of Examples 41-49 optionally include wherein the aggregated engagement factor includes a plurality of engagement factors, and wherein to automatically determine the aggregated engagement factor includes to automatically determine the aggregated engagement factor from the plurality of engagement factors.

In Example 51, the subject matter of any one or more of Examples 41-50 optionally include means for applying a weight to the plurality of engagement factors.

In Example 52, the subject matter of any one or more of Examples 41-51 optionally include means for interpreting a second set of aggregated sensor data to automatically determine a second aggregated engagement factor of the pet owner to the pet; and means for determining whether the second aggregated engagement factor exceeds the aggregated engagement factor.

In Example 53, the subject matter of Example 52 optionally includes in response to determining that the second aggregated engagement factor is below the aggregated engagement factor, means for alerting the pet owner.

In Example 54, the subject matter of any one or more of Examples 52-53 optionally include wherein the report includes a trend analysis based on the aggregated engagement factor and the second aggregated engagement factor.

In Example 55, the subject matter of any one or more of Examples 41-54 optionally include wherein the pet behavior metrics indicate a leash is connected to a collar of the pet.

In Example 56, the subject matter of any one or more of Examples 41-55 optionally include means for providing a recommendation for improving the aggregated engagement factor.

In Example 57, the subject matter of any one or more of Examples 41-56 optionally include wherein a sensor the plurality of sensors is a wearable device used by the pet owner, and the sensor data includes sensor data from the wearable device.

In Example 58, the subject matter of any one or more of Examples 41-57 optionally include wherein the means for interpreting the aggregated sensor data to automatically determine the aggregated engagement factor include means for determining that the sensor data from the wearable device includes a location and timing correspondence to the pet behavior metrics, and wherein the report positively reflects that the location and timing data of sensor data from the wearable device corresponds to the pet behavior metrics.

In Example 59, the subject matter of any one or more of Examples 41-58 optionally include wherein the means for outputting the report include means for outputting the report using an Application Programming Interface (API) protocol.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A system for automatically tracking pet owner interaction with a pet, the system comprising:
   a receiver to obtain sensor data including pet behavior metrics from a plurality of sensors, the plurality of sensors including at least one sensor of an on-pet device and at least one sensor of an off-pet device;
   an aggregator to aggregate the sensor data over a predetermined period of time;
   an engagement factor component, corresponding to a health status of the pet owner, to interpret the aggregated sensor data to automatically determine an aggregated engagement factor of the pet owner to the pet, the aggregated engagement factor corresponding to overall interaction between the pet owner and the pet, wherein the aggregated engagement factor is based on a plurality of engagement factors; and
   a transmitter to output a report indicating the aggregated engagement factor corresponding to the health status of the pet owner.

2. The system of claim 1, wherein to output the report, the transmitter is to output the report to a user who is not the pet owner.

3. The system of claim 2, further comprising a comparator to determine whether the aggregated engagement factor is below a baseline engagement factor; and wherein the transmitter is further to output, in response to determining that the aggregated engagement factor is below the baseline engagement factor, an alert indicating the aggregated engagement factor is below the baseline engagement factor.

4. The system of claim 3, wherein the baseline engagement factor is preset by the user who is not the pet owner.

5. The system of claim 3, wherein the baseline engagement factor is determined using a machine learning technique.

6. The system of claim 5, wherein the machine learning technique is used to determine a change in activity of the pet owner over time.

7. The system of claim 3, wherein the transmitter is to, in response to determining that the aggregated engagement factor exceeds the baseline engagement factor, output an indication of a healthy overall interaction.

8. The system of claim 1, wherein the on-pet device is a pet wearable device and the at least one sensor of the on-pet device includes at least one of a movement sensor, a biosensor, and a GPS sensor.

9. The system of claim 1, wherein the off-pet device includes at least one of a pet collaboration device, a pet motion sensor device, and a pet bowl device.

10. The system of claim 1, wherein to automatically determine the aggregated engagement factor includes to automatically determine the aggregated engagement factor from the plurality of engagement factors.

11. The system of claim 1, wherein the engagement factor component is further to apply a weight to the plurality of engagement factors.

12. The system of claim 1, wherein the engagement factor component is further to:
   interpret a second set of aggregated sensor data to automatically determine a second aggregated engagement factor of the pet owner to the pet; and
   determine whether the second aggregated engagement factor exceeds the aggregated engagement factor.

13. The system of claim 12, wherein the transmitter is to, in response to determining that the second aggregated engagement factor is below the aggregated engagement factor, alert the pet owner.

14. The system of claim 12, wherein the report includes a trend analysis based on the aggregated engagement factor and the second aggregated engagement factor.

15. The system of claim 1, wherein the pet behavior metrics indicate a leash is connected to a collar of the pet.

16. The system of claim 1, wherein the transmitter is further to provide a recommendation for improving the aggregated engagement factor.

17. The system of claim 1, wherein a sensor of the plurality of sensors is a wearable device used by the pet owner, and the sensor data includes sensor data from the wearable device.

18. The system of claim 17, wherein to interpret the aggregated sensor data to automatically determine the aggregated engagement factor, the engagement factor component is further to determine that the sensor data from the wearable device includes location and timing data corresponding to the pet behavior metrics, and wherein the report positively reflects that the location and timing data of sensor data from the wearable device corresponds to the pet behavior metrics.

19. The system of claim 1, wherein to output the report, the transmitter is to output the report using an Application Programming Interface (API) protocol.

20. A method for automatically determining pet owner interaction with a pet, the method comprising:
   obtaining sensor data including pet behavior metrics from a plurality of sensors, the plurality of sensors including at least one sensor of an on-pet device and at least one sensor of an off-pet device;
   aggregating the sensor data over a predetermined period of time;
   interpreting the aggregated sensor data to automatically determine an aggregated engagement factor corresponding to a health status of the pet owner, of the pet owner to the pet, the aggregated engagement factor corresponding to overall interaction between the pet owner and the pet, wherein the aggregated engagement factor is based on a plurality of engagement factors; and
   outputting a report indicating the aggregated engagement factor, corresponding to the health status of the pet owner.

21. The method of claim 20, wherein outputting the report includes outputting the report to a user who is not the pet owner.

22. The method of claim 21, further comprising determining whether the aggregated engagement factor is below a baseline engagement factor, and outputting, in response to determining that the aggregated engagement factor is below the baseline engagement factor, an alert indicating the aggregated engagement factor is below the baseline engagement factor.

23. At least one non-transitory machine readable medium, including instructions, which when performed by a machine, cause the machine to:
   obtain sensor data including pet behavior metrics from a plurality of sensors, the plurality of sensors including at least one sensor of an on-pet device and at least one sensor of an off-pet device;
   aggregate the sensor data over a predetermined period of time;
   interpret the aggregated sensor data to automatically determine an aggregated engagement factor corresponding to a health status of the pet owner, of the pet owner to the pet, the aggregated engagement factor corresponding to overall interaction between the pet owner and the pet, wherein the aggregated engagement factor is based on a plurality of engagement factors; and output a report indicating the aggregated engagement factor corresponding to the health status of the pet owner.

24. The at least one non-transitory machine readable medium of claim 23, further comprising instructions to apply a weight to the plurality of engagement factors.

25. The at least one non-transitory machine readable medium of claim 23, further comprising instructions to provide a recommendation for improving the aggregated engagement factor.

* * * * *

UNITED STATES PATENT AND TRADEMARK OFFICE
CERTIFICATE OF CORRECTION

PATENT NO. : 10,600,303 B2
APPLICATION NO. : 15/189265
DATED : March 24, 2020
INVENTOR(S) : Lamkin et al.

Page 1 of 1

It is certified that error appears in the above-identified patent and that said Letters Patent is hereby corrected as shown below:

On the Title Page

On page 2, in Column 1, item (56) under "Other Publications", Line 7, delete "Owndership" and insert --Ownership-- therefor Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*